US012780229B1

(12) United States Patent
Ramsey et al.

(10) Patent No.: US 12,780,229 B1
(45) Date of Patent: Nov. 3, 2026

(54) MODULE FOR ACCURATE CALIBRATION OF VEHICLE SPEED CORRECTING FOR TIRE SIZE VARIANCE

(71) Applicant: Memphis Engine Tuning Company, Memphis, TN (US)

(72) Inventors: Gregory Jay Ramsey, Memphis, TN (US); Larry Eugene Pelton, Jr., Germantown, TN (US); John Byrd French, Collierville, TN (US); Roger D. Burks, Eads, TN (US)

(73) Assignee: Memphis Engine Tuning Company, Memphis, TN (US)

( * ) Notice: Subject to any disclaimer, the term of this patent is extended or adjusted under 35 U.S.C. 154(b) by 0 days.

(21) Appl. No.: 19/224,836

(22) Filed: Jun. 1, 2025

(51) Int. Cl.
*B60W 50/06* (2006.01)
*B60C 23/06* (2006.01)
(Continued)

(52) U.S. Cl.
CPC .......... *B60W 50/06* (2013.01); *B60C 23/061* (2013.01); *B60R 16/0207* (2013.01);
(Continued)

(58) Field of Classification Search
CPC ......... B60W 50/06; B60W 2050/0088; B60W 2510/104; B60W 2520/28; B60C 23/061; B60R 16/0207
See application file for complete search history.

(56) References Cited

U.S. PATENT DOCUMENTS 8,336,364 B2 * 12/2012 Munko .................... G01P 7/00 73/1.37
2009/0205401 A1 * 8/2009 Munko .................. G01P 21/00 73/1.37

(Continued)

FOREIGN PATENT DOCUMENTS

CA 2299748 A1 * 8/2000 .......... B60C 23/062
JP 4921632 B2 * 4/2012 ............ F16H 15/38

(Continued)

OTHER PUBLICATIONS

Translation of JP-4921632-B2, 15 pages (Year: 2012).*
Translation of WO-03091056-A1, 12 pages (Year: 2003).*
Translation of WO-2006062033-A1, 43 pages (Year: 2006).*

*Primary Examiner* — Dale W Hilgendorf
(74) *Attorney, Agent, or Firm* — Brie A. Crawford; Crawford Intellectual Property Law LLC

(57) ABSTRACT

A module for accurate calibration of vehicle speed correcting for tire size variance has a module connected to a harness and the harness electronically connecting the module to the electronic brake control module (EBCM), the transmission control module (TCM), the electronic brake control module harness, and the transmission control module harness. The EBCM harness is electronically connected to at least one wheel speed sensor and the wheel speed sensors send raw data to the module. The TCM harness is electronically connected to at least one transmission shaft-speed sensor and the transmission shaft-speed sensors send raw data to the module. The module applies an algorithm to correct the (Continued)

data due to a difference in the non-stock tire size from the factory tires and sends the corrected data to the EBCM and the TCM. The EBCM and the TCM send the corrected data to the vehicle network.

3 Claims, 5 Drawing Sheets

(51) Int. Cl.
*B60R 16/02* (2006.01)
*B60W 50/00* (2006.01)

(52) U.S. Cl.
CPC ............... *B60W 2050/0088* (2013.01); *B60W 2510/104* (2013.01); *B60W 2520/28* (2013.01)

(56) References Cited

U.S. PATENT DOCUMENTS

2011/0246031 A1* 10/2011 Uematsu ................. B60T 10/00 701/50
2021/0339757 A1* 11/2021 Rollinger ............ B60W 40/105

FOREIGN PATENT DOCUMENTS

WO WO-03091056 A1 * 11/2003 ......... B60K 23/0808
WO WO-2006062033 A1 * 6/2006 ............. F16H 47/02

* cited by examiner

MODULE FOR ACCURATE CALIBRATION OF VEHICLE SPEED CORRECTING FOR TIRE SIZE VARIANCE

This invention relates to a module for accurate calibration of vehicle speed correcting for tire size variance and more particularly, this invention relates to a module for accurate calibration of vehicle speed correcting for tire size variance which has a module which cooperates with components of the vehicle to collect data and apply an algorithm to correct for an inaccurate measurement of speed due to a difference in tire size from the factory tires and sends the corrected data to the vehicle network.

BACKGROUND OF THE INVENTION

When driving, it is important to know the speed the vehicle is travelling on the road. Vehicles have a speedometer to display this information to the driver and the speedometer cooperates with the odometer to give an accurate mileage on the car. The speedometer is connected to computers which cooperate with sensors on the wheels and the drive shaft exiting the transmission to measure how fast the vehicle is travelling. The software for the vehicle network is calibrated for the standard, factory, or original equipment manufacturer tires (hereinafter "factory tires") that are on the vehicle when the vehicle leaves the factory. However, the owner of the vehicle may put larger or smaller tires on the vehicle (hereinafter "non-stock tires") after the software is calibrated.

When the size or diameter of the tire changes the original calibration of the computers to measure speed may be off. For example, if larger non-stock tires are placed on the vehicle, the speedometer may be inaccurate in showing a lower speed than the vehicle is actually travelling. The non-stock tires may be rotating at the same revolutions per minute (hereinafter "RPM") as the smaller factory tire. But, the vehicle is travelling at a higher speed due to the larger size of the non-stock tires. Thus, an inaccurate speed can be displayed on the speedometer. A module for accurate calibration of vehicle speed correcting for tire size variance will be a useful invention.

SUMMARY OF THE INVENTION

An objective of the present invention is the provision of a module for accurate calibration of vehicle speed correcting for tire size variance that can calibrate an accurate vehicle speed while accommodating for non-stock tires with a larger or smaller tire diameter than the factory tires.

Another objective of the present invention is the provision of a module for accurate calibration of vehicle speed correcting for tire size variance that cooperates with at least one wheel speed sensor and at least one transmission shaft-speed sensor to receive data from each, apply and algorithm to correct data due to the variance in size from the non-stock tires on the vehicle from the factory tires, and send the corrected data back to the vehicle network.

Other objectives and advantages of the invention will become apparent from the description of the preferred embodiment.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
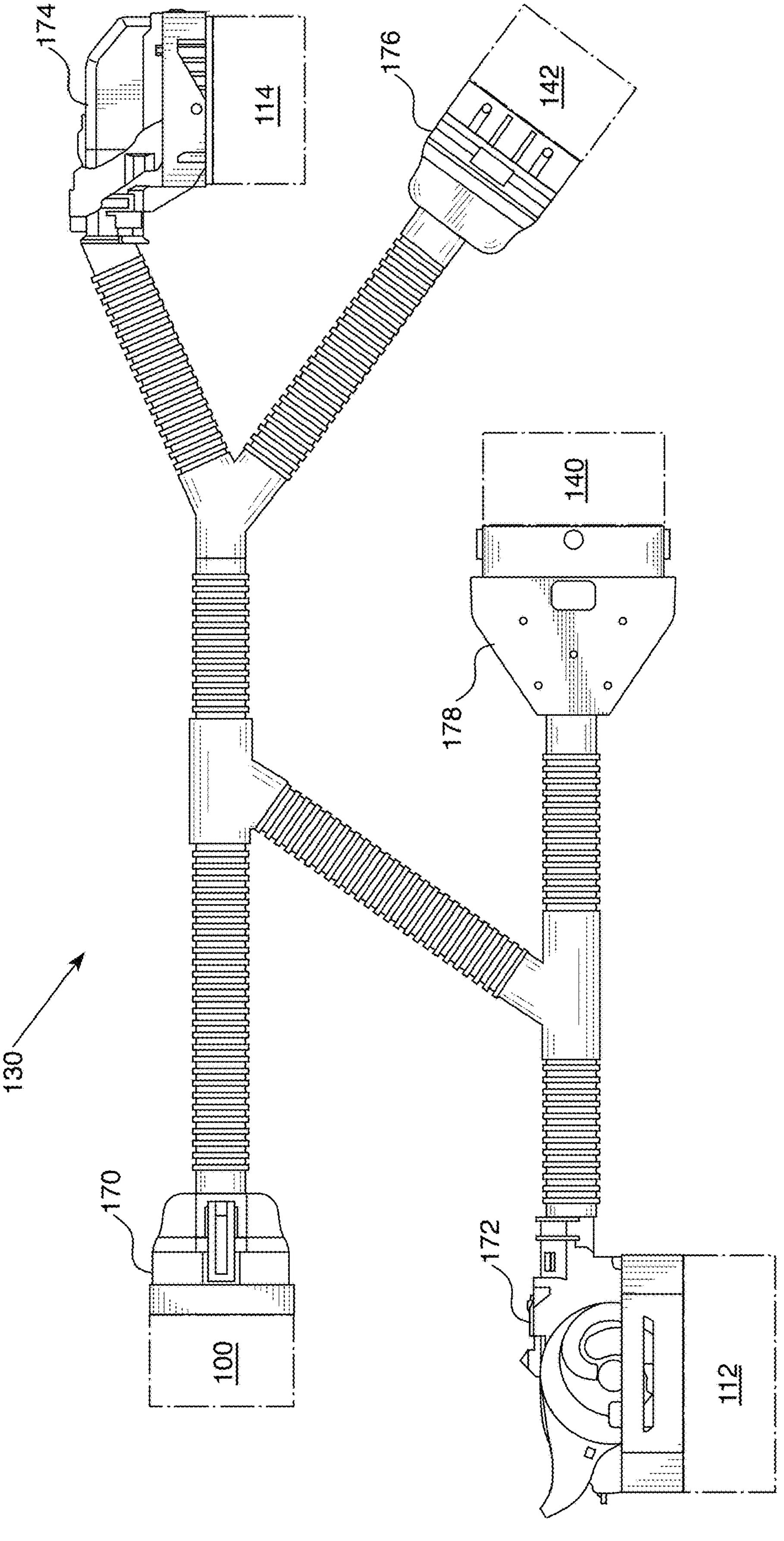
FIG. 1 depicts a top view of harness 130 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

Throughout this disclosure, the term vehicle network will be used. The vehicle network is the internal communication network that connects vehicle subsystems internally and to one another so that they can coordinate their functions.

Figure 2A:
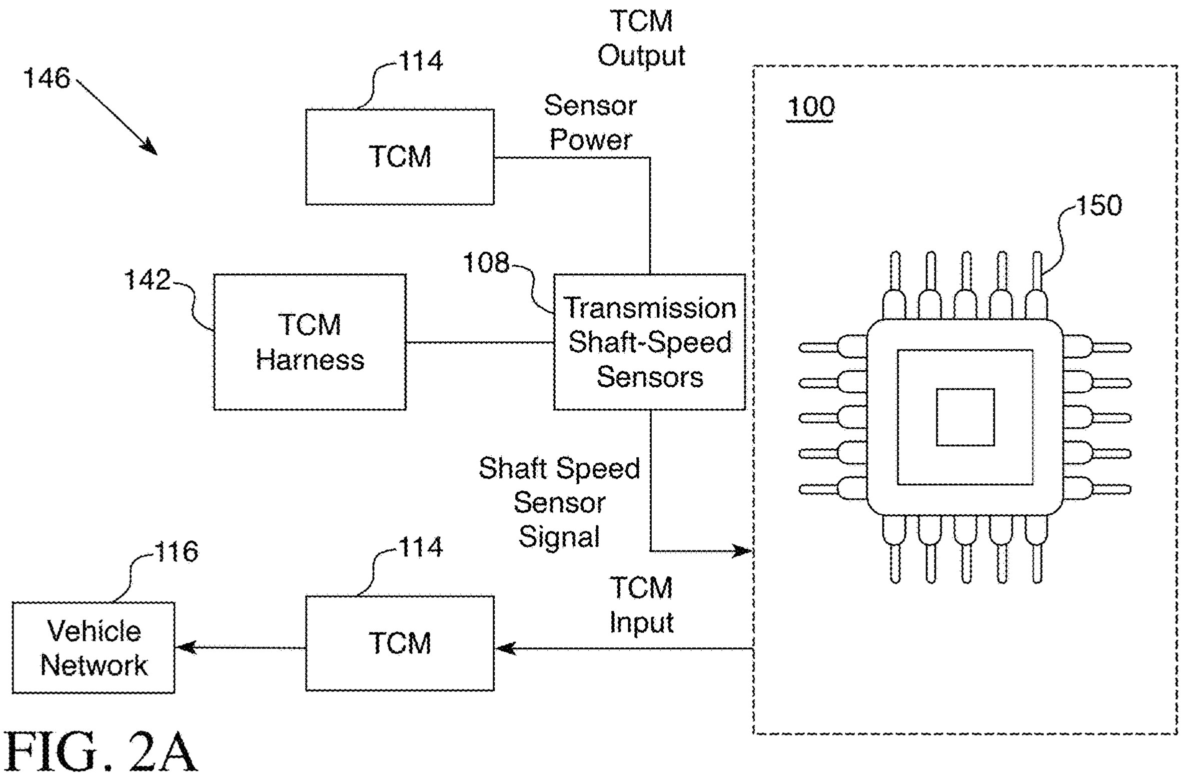
FIG. 2A depicts a flow chart of the transmission shaft-speed signal channel 146 of module 100 of this invention.
Figure 2B:
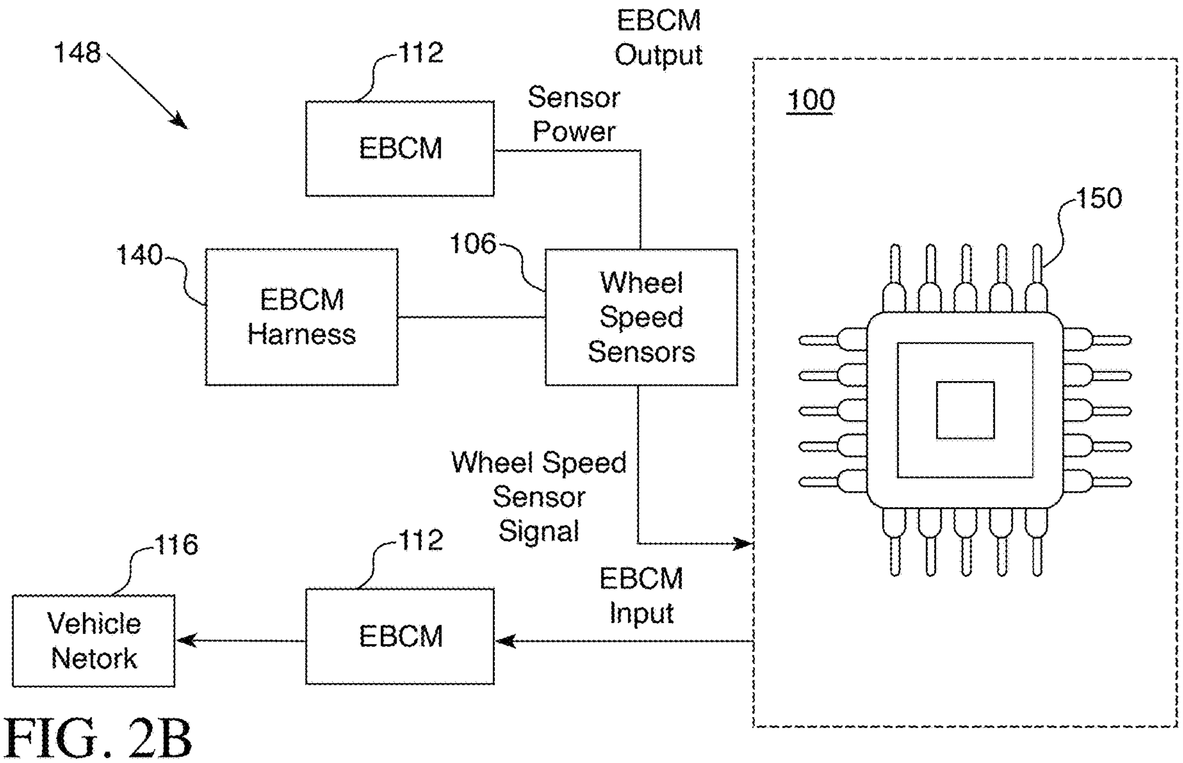
FIG. 2B depicts a flow chart of the wheel speed signal channel 148 of module 100 of this invention.
Figure 3:
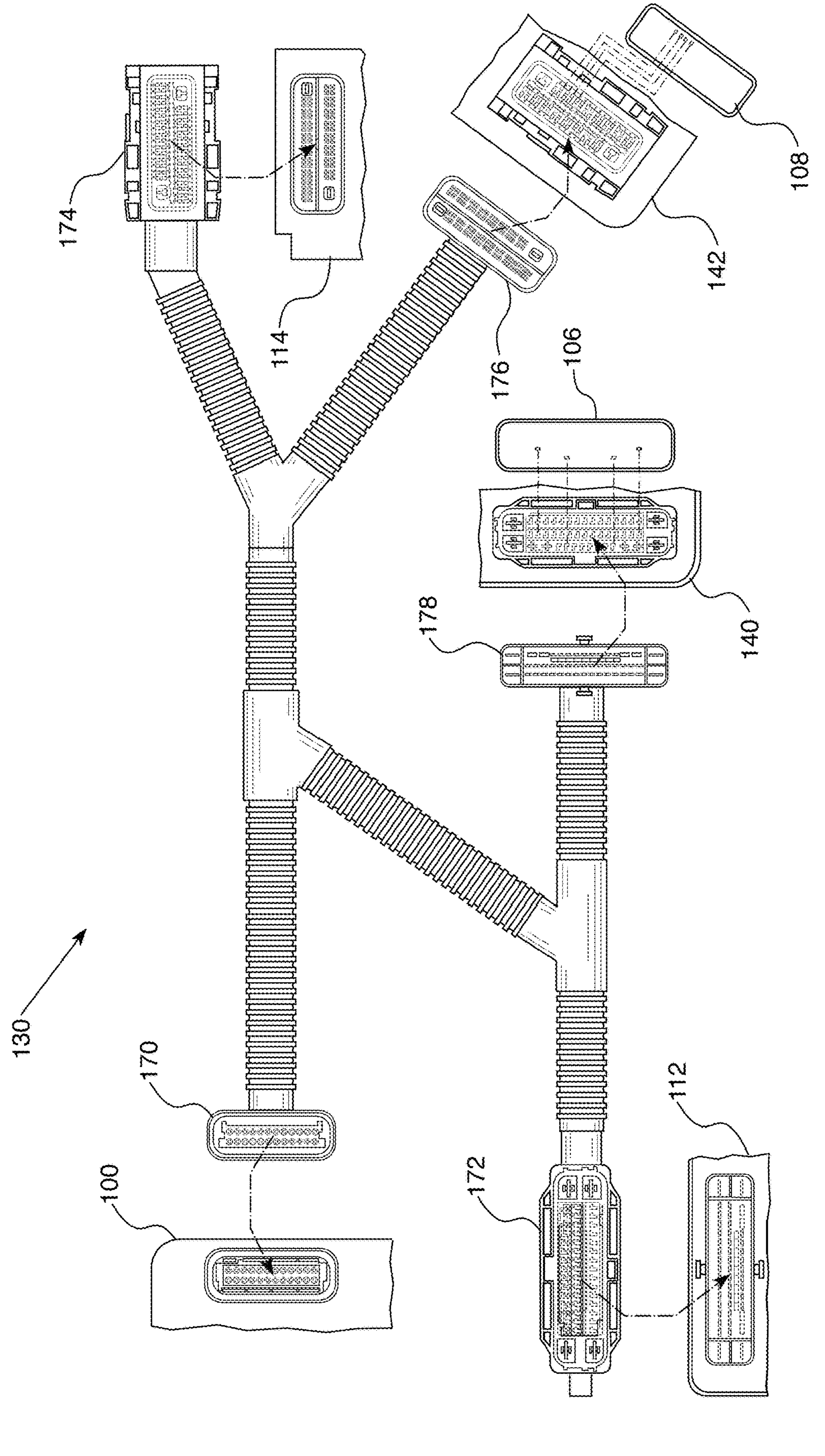
FIG. 3 depicts a top view of harness 130 of this invention connected to module 100 and the components of vehicle 102.
Figure 4:
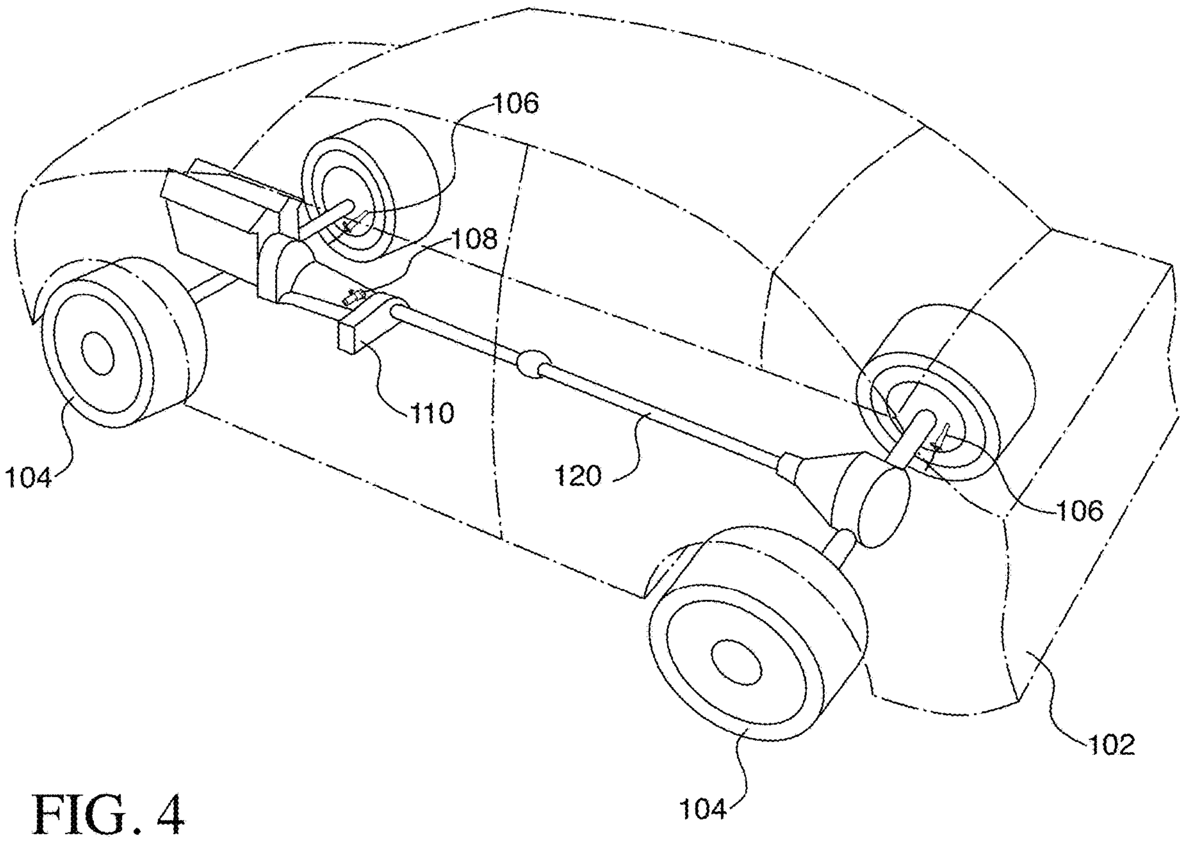
FIG. 4 depicts a perspective view of vehicle 102 which is depicted in phantom.
Figure 5:
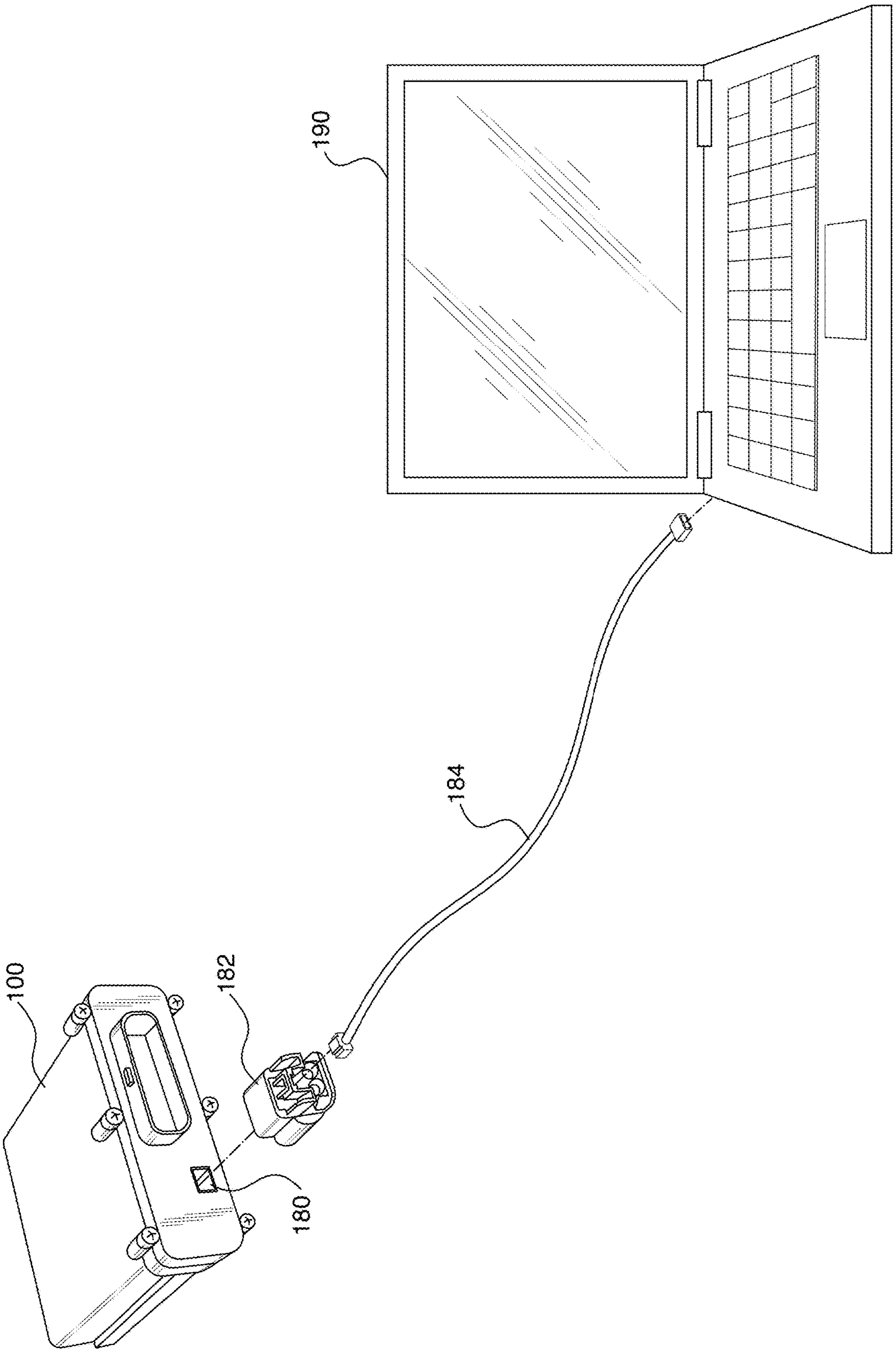
FIG. 5 depicts an exploded perspective view of module 100 connecting to external electronic device 190 through USB cable 184.

Now adding FIG. 1, FIG. 2A, FIG. 2B, FIG. 3, FIG. 4, and FIG. 5 to the consideration, the module for accurate calibration of vehicle speed correcting for tire size variance 100 (hereinafter "module 100 or modules 100") can be clearly seen. Vehicle 102 has one or more wheel speed sensors 106 attached to one or more wheels 104. Wheel speed sensors 106 monitor the speed of each wheel 104 and send the wheel speed information to the computer system of vehicle 102 (through the electronic brake control module harness 140).

Transmission 110 or drive shaft 120 of vehicle 102 have one or more transmission shaft-speed sensors 108 attached to it. The transmission shaft-speed sensors 108 calculate the rotational speed of the input shaft and/or the output shaft of the transmission 110 and the transmission shaft-speed sensors 108 send the rotational speed information to the vehicle network of the vehicle 102 (through the transmission control module harness 142) to calculate the current gear ratio. The location of the wheel speed sensors 106 and transmission shaft-speed sensors 108 vary by make and model of vehicle 102 and the exact location can be found in the vehicle manufacturer's specifications or literature.

The vehicle also has an electronic brake control module 112 and a transmission control module 114. Modules 112 and 114 are placed in the vehicle 102 per the vehicle manufacturer's specifications or literature.

Electronic brake control module harness 140 is electronically connected to each of the one or more wheel speed sensors 106. Transmission control module harness 142 is electronically connected to each of the one or more transmission shaft-speed sensors 108.

Module 100 is electronically connected to harness 130 at harness module connector 170.

Harness 130 electronically connects to the electronic brake control module 112 through the electronic brake control module connector 172. Also, harness 130 electronically connects to the electronic brake control module harness 140 through the electronic brake control module harness connector 178. The connection between the harness 130, the electronic brake control module 112 and the electronic brake control module harness 140 electronically connects the module 100 to the electronic brake control module 112 and the electronic brake control module harness 140.

Harness 130 electronically connects to the transmission control module 114 through the transmission control module connector 174. Also, harness 130 electronically connects to the transmission control module harness 142 through the transmission control module harness connector 176. The connection between harness 130, transmission control module 114, and the transmission control module harness 142 electronically connects module 100 to the transmission control module 114 and the transmission control module harness 142.

Module 100 is a computer and has a microprocessor 150. In the transmission speed signal channel 146, transmission shaft-speed sensors 108 detect the rotation of the drive shaft 120 (as previously described). Module 100 receives inputs from the transmission shaft-speed sensors 108, through the transmission control module harness 142, and applies an algorithm to compensate for error in the digital data from the transmission shaft-speed sensors 108 due to a difference in non-stock tire size from the factory tires. Module 100, through the algorithm, corrects the error in the data, and sends the corrected data to the transmission control module 114. The transmission control module 114 sends the corrected data to the vehicle network 116.

In the wheel speed signal channel 148, wheel speed sensors 106 detect the speed and direction of rotation of the wheels 104. Module 100 receives inputs from the wheel speed sensors 106, through the electronic brake control module harness 140, and applies an algorithm to compensate for error in the digital data from the wheel speed sensors 106 due to a difference in non-stock tire size from the factory tires. Module 100, through the algorithm, corrects the error in the data, and sends the corrected data to the electronic brake control module 112. Electronic brake control module 112 sends the corrected data to the vehicle network 116.

The transmission control module 114 sends power from the car battery to the transmission shaft-speed sensors 108. The transmission control module 114 also monitors the current drawn by the transmission shaft-speed sensors 108 and sends alarms if the draw is outside of pre-established parameters.

Electronic brake control module 112 sends power from the battery of the vehicle 102 to the wheel speed sensors 106. Electronic brake control module 112 also monitors current drawn from the wheel speed sensors 106 and the integrity of the signals received from the wheel speed sensors 106 and can set off alarms or shut off power to a wheel speed sensor 106 if the current drawn is outside of a pre-determined range.

Module 100 has universal serial bus (hereinafter "USB") port 180 which receives USB plug 182. External electronic device 190 connects to module 100 through USB cable 184 which is received by USB plug 182.

Once module 100 is installed in vehicle 102 and harness 130 is connected to electronic brake control module 112, transmission control module 114, module 100, electronic brake control module harness 140, and transmission control module harness 142, module 100 receives power from the vehicle's battery. Then, module 100 can be connected to external electronic device 190. Module 100 can download software from external electronic device 190. Also, external electronic device 190 can be used to calibrate module 100 by allowing the user to input specific information, into the module 100 using the software, about their vehicle and tires. This information can include, but is not limited to vehicle make, model, and year, factory tire size, the non-stock tire size, and any other relevant information. This allows module 100 to be calibrated for the specific details of vehicle 102 and non-stock tires.

External electronic device 190 can be a laptop computer, a tablet, a cellular or smart phone, a desktop computer or any other suitable electronic device that can send data, software, and other information between module 100 and external electronic device 190 through USB cable 184.

While various embodiments and aspects of the present invention have been described above, it should be understood that they have been presented by way of example only, and not limitation. Thus, the breadth and scope of the present invention should not be limited by any of the above exemplary embodiments.

This application—taken as a whole with the abstract, specification, claims, and drawings being combined—provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this apparatus can become clear to a person having ordinary skill in this particular art. Such modifications are clearly covered by this disclosure.

What is claimed and sought to be protected by Letters Patent is:

1. A module for accurate calibration of vehicle speed correcting for tire size variance comprising:

a) the module for accurate calibration of vehicle speed correcting for tire size variance being configured to cooperate with an electronic brake control module, an electronic brake control module harness, a transmission control module, and a transmission control module harness on a vehicle, wherein the transmission control module harness is electronically connected to at least one transmission shaft-speed sensor and further wherein, the electronic brake control module harness is electronically connected to at least one wheel speed sensor;

b) the module for accurate calibration of vehicle speed correcting for tire size variance electronically connecting to a harness, wherein the harness is electronically connected to the electronic brake control module, the transmission control module, the transmission control module harness, and the electronic brake control module harness, further wherein, the connection between the harness and the electronic brake control module, the transmission control module, the electronic brake control module harness, and the transmission control module harness, and the module for accurate calibration of vehicle speed correcting for tire size variance connects the module for accurate calibration of vehicle speed correcting for tire size variance to the transmission control module, the transmission control module harness, the electronic brake control module, and the electronic brake control module harness;

c) the module for accurate calibration of vehicle speed correcting for tire size variance being configured to process an algorithm, wherein the algorithm is configured to process raw data coming from the at least one transmission shaft-speed sensor, through the transmission control module harness, and the at least one wheel speed sensor, through the electronic brake control module harness, to create corrected data which is a speed of rotation of at least one wheel on the vehicle and the speed of rotation of a drive shaft on the vehicle corrected for tire size variance; and d) the module for accurate calibration of vehicle speed correcting for tire size variance being configured to perform calibration of the vehicle speed based on the corrected data.

2. The module of claim 1 further comprising:

a) the module for accurate calibration of vehicle speed correcting for tire size variance receiving the raw data from the at least one wheel speed sensor through the electronic brake control module harness, using the algorithm to process the raw data, and sending the corrected data to the electronic brake control module; and b) the module for accurate calibration of vehicle speed correcting for tire size variance receiving raw data from the at least one transmission shaft-speed sensor through the transmission control module harness, processing the raw data using the algorithm, and sending the corrected data to the transmission control module.

3. The module of claim 2 further comprising:

a) the electronic brake control module receiving the corrected data from the module for accurate calibration of vehicle speed correcting for tire size variance and sending the corrected data to a vehicle network; and b) the transmission control module receiving the corrected data from the module for accurate calibration of vehicle speed correcting for tire size variance and sending the corrected data to the vehicle network.

* * * * *